(12) United States Patent
Bushberg

(10) Patent No.: US 7,629,580 B2
(45) Date of Patent: Dec. 8, 2009

(54) DYNAMIC EMERGENCY RADIATION MONITOR

(76) Inventor: Jerrold T. Bushberg, 7784 Oak Bay Cir., Sacramento, CA (US) 95831

( * ) Notice: Subject to any disclaimer, the term of this patent is extended or adjusted under 35 U.S.C. 154(b) by 182 days.

(21) Appl. No.: 11/740,888

(22) Filed: Apr. 26, 2007

(65) Prior Publication Data
US 2008/0111073 A1   May 15, 2008

Related U.S. Application Data

(63) Continuation of application No. PCT/US2006/004961, filed on Feb. 9, 2006.

(60) Provisional application No. 60/652,168, filed on Feb. 10, 2005.

(51) Int. Cl.
*G01J 5/00* (2006.01)
(52) U.S. Cl. .................................................. 250/336.1
(58) Field of Classification Search ............... 250/336.1
See application file for complete search history.

(56) References Cited

U.S. PATENT DOCUMENTS 4,451,158 A    5/1984    Selwyn et al.
4,642,463 A    2/1987    Thoms
4,695,730 A    9/1987    Noda et al.
4,733,383 A    3/1988    Waterbury
4,786,902 A    11/1988   Davis et al.
5,132,543 A    7/1992    Valentine et al.
5,572,027 A *  11/1996   Tawil et al. .............. 250/336.1
5,666,105 A    9/1997    Adler et al.
6,406,914 B1   6/2002    Kaburaki et al.

* cited by examiner

*Primary Examiner*—David P. Porta
*Assistant Examiner*—Mark R Gaworecki
(74) *Attorney, Agent, or Firm*—John P. O'Banion

(57) ABSTRACT

A dynamic radiation monitor having a detector coupled to a computer to determine at any given location, the amount of time a person has before a pre-selected maximum permissible radiation exposure is received. The device dynamically calculates and outputs the user's permissible stay time for a given area based on a personalized maximum permissible dose, and adjusts in real time the output based on elapsed time and changing exposure rate. The device also provides the user audio and visual feedback such as varying background colors for different stay time ranges.

27 Claims, 7 Drawing Sheets

US 7,629,580 B2

DYNAMIC EMERGENCY RADIATION MONITOR

CROSS-REFERENCE TO RELATED APPLICATIONS

This application claims priority from, and is a 35 U.S.C. § 111(a) continuation of, co-pending PCT international application serial number PCT/US2006/004961 filed on Feb. 9, 2006, incorporated herein by reference in its entirety, which designates the U.S. and which claims priority from U.S. provisional application Ser. No. 60/652,168 filed on Feb. 10, 2005, incorporated herein by reference in its entirety.

This application is related to U.S. Pat. No. 7,205,544 issued on Apr. 17, 2007, incorporated herein by reference in its entirety.

This application is also related to U.S. Patent Application Publication No. US 2006/0237648 A1, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains to a dynamic radiation monitor, and in particular, a dynamic radiation monitor that determines, at any given time, the amount of time a person has at a particular location until receiving a pre-selected maximum permissible radiation exposure.

2. Description of Related Art

Monitoring radiation levels is advantageous in a number of different environments. For example, in the nuclear power industry, the exposure of people to occupational radiation must be monitored in order to protect their health. In normal operation, this problem has been solved with relatively simple and inexpensive devices.

In other situations such as in the case of a radiation leak which requires clean-up operations, or nuclear or dirty bomb detonation, the radiation levels to be encountered are not easily predicted, and these levels would likely be much higher than those encountered in the more normal situation. The higher radiation levels mean that an individual's exposure can rapidly approach safe limits. Therefore, it is important to have a device capable of calculating and displaying in real time the radiation dose, dose rate, as well as the allowable stay time, in addition to providing visual and/or audio alarms that are readily and reliably relied to the operator Radiation monitors which indicate whether a biological organism, such as a person, has been exposed to radiation are well known. For example, U.S. Pat. No. 4,642,463 (Thoms) issued Feb. 10, 1987 and entitled INTELLIGENT RADIATION MONITOR, which is incorporated herein by reference in its entirety, discloses a radiation monitor having a processor and display for detecting and signaling real time radiation rates.

U.S. Pat. No. 5,572,027 (Tawil et al.) issued Nov. 5, 1996 and entitled INTEGRATED DOSIMETER FOR SIMULTANEOUS PASSIVE AND ACTIVE DOSIMETRY, which is incorporated herein by reference in its entirety, discloses a radiation monitoring system using paired active and passive radiation detectors to monitor radiation exposure. The active detector has a processor to monitor the radiation rate and dose level, and has a LCD display for indicating the dose and/or dose rate.

U.S. Pat. No. 6,031,454 (Lovejoy et al.) issued Feb. 29, 2000 and entitled WORKER SPECIFIC EXPOSURE MONITOR AND METHOD OF SURVEILLANCE OF WORKERS, which is incorporated herein by reference in its entirety, discloses a radiation monitor that tracks radiation doses in real time.

The above mentioned devices, however, do not process the detected radiation data in form that is convenient or desirable to the user. The vast majority of first responders to a radiation event will likely not be experts in radiation detection technology or radiation safety. Even if they have received training, they will likely not remember the significance of the various radiation units displayed by current generation meters and dosimeters. These first responders need to be able to stay focused on their area of expertise (e.g., fire-fighting, rescue operations, emergency medical treatment, crowd control, forensics, etc.). When responding to the scene, the following factors are generally of paramount interest to the responder: radiation levels with respect to normal background, time left to work safely; safety of some locations with respect to others, significant changes in the radiation hazard environment, and when to leave the area.

Therefore, an objective of the present invention is to provide a real-time radiation monitor that is programmable to allow for quick and identifiable communication of critical information that is of interest to the responder.

BRIEF SUMMARY OF THE INVENTION

An aspect of the invention is a personal radiation monitor having a detector configured for producing real time radiation exposure data, and a processor responsive to the detector and configured for calculating one or more characteristics of an individual's radiation exposure. The processor is configured to continuously recalculate said radiation exposure data to update the radiation exposure characteristics, such that a display responsive to information provided by the processor. The display is adapted to display at least one of the radiation exposure characteristics as a primary signal from said processor. The processor is further configured to transmit a secondary signal to the individual, wherein the secondary signal correlates to a range of values of one of the radiation exposure characteristics.

In one embodiment, the display comprises an illuminated background that is responsive to the secondary signal, wherein the illuminated background color is configured to change color upon the radiation exposure characteristic exceeding a threshold limit outside the range of values. The display background may be further configured to illuminate a first color upon a radiation exposure characteristic falling within a first range of values, a second color upon a radiation exposure characteristic falling within a second range of values, and a third color upon a radiation exposure characteristic falling within a third range of values. The display background may also be configured to flash the third color upon a radiation exposure characteristic falling within a fourth range of values.

In one variation of the current embodiment, the processor is further configured to transmit a tertiary signal to the individual, wherein the tertiary signal comprises an audio signal having a rate associated with the range of values, and wherein the audio signal rate is configured to change upon one of the one or more radiation exposure characteristics exceeding a threshold limit outside the range of values.

In an alternative embodiment, the monitor may have one or more illumination sources in proximity to the display, wherein the illumination sources are responsive to the secondary signal so as to communicate one or more radiation exposure characteristics exceeding a threshold limit outside the range of values.

In yet another alternative embodiment, the secondary signal comprises an audio signal having a rate associated with the range of values, wherein the audio signal rate is configured to change upon one of the one or more radiation exposure characteristics exceeding a threshold limit outside the range of values.

The radiation exposure characteristics may comprise a number of indications, including accumulative radiation exposure level, radiation dose rate, and a stay time based on the individual's maximum permissible radiation dose limit, wherein the processor is configured to continuously recalculate the stay time to accommodate for the accumulative exposure level or changing radiation dose rates. The background color of the display may further be configured to change color when the stay time exceeds a threshold limit outside the range of values.

In another embodiment, the processor is configured to output the stay time to the display during a display time interval, wherein the display time interval locks the value of the display for a specified period of time. In addition to, or as an alternative to the display time interval, the processor may be configured to average the radiation dose rate over a period of time to stabilize the display of the stay time in fluctuating radiation exposure environments.

In another preferred embodiment, the display is configured to display two or more of either the radiation dose rate, accumulative dose, or stay time simultaneously. In addition, the display may be configured to display one of the radiation exposure characteristics as a primary readout, and the remaining radiation exposure characteristics are simultaneously displayed on a status meter.

The monitor may also comprise a plurality of controls coupled to the processor, wherein the controls are configured to allow parameters of the radiation exposure characteristics to be pre-programmed by the individual. The controls may also be configured to allow the primary readout to be toggled between the one or more radiation exposure characteristics.

In another embodiment, the display is further configured to transmit a pre-programmed text message upon a specified radiation exposure characteristic value, such as stay time, dose rate, or cumulative dose.

Another aspect of the invention is a personal radiation monitor, having a detector configured for producing real time radiation exposure data, and a processor responsive to the detector and configured for calculating a stay time based on an individual's maximum permissible radiation dose limit, the processor further configured for continuously recalculating the stay time based on the individual's accumulated exposure and radiation exposure rate. The monitor further comprises a display responsive to information provided by the processor, wherein the display is adapted for displaying at least the stay time data from the processor, and has a variable background that changes color based on changes in the stay time data.

In a preferred embodiment of the current aspect, the display exhibits a first color for a stay time greater than a first time period, a second color for a stay time less than a second time period, and a third color for a stay time less than a third time period.

In another embodiment, the processor may further configured to transmit an audio signal to the individual, wherein the audio signal has a rate associated with the stay time that changes in the stay time data.

The monitor may further include a plurality of controls coupled to the processor, wherein the controls are configured to allow parameters of the maximum permissible exposure, stay time, accumulated exposure and radiation exposure rate to be pre-programmed by the individual.

A further aspect of the invention is a method of monitoring radiation exposure levels. The method includes the steps of inputting an individual's maximum permissible radiation dose limit, detecting radiation exposure levels at a location at or near the individual, calculating a stay time as a function of the detected radiation exposure levels and the maximum permissible radiation dose limit, and displaying the stay time against an illuminated background. The method further includes the steps of continuously recalculating the stay time according to the individual's detected accumulated exposure and radiation exposure rate, updating the display of the stay time, and changing the background color in response to the stay time falling outside a predetermined range of values.

In a preferred embodiment of the current aspect, changing the background color comprises illuminating a first color for a stay time greater than a first time period, illuminating a second color for a stay time less than a second time period, and illuminating a third color for a stay time less than a third time period. In addition a third color may be flashed in response to the stay time having a value less than a fourth time period.

The method may further include transmitting an audio signal to the individual, wherein the audio signal has a rate associated with the stay time that changes upon the value of the stay time.

In a preferred embodiment, the individual's stay time, accumulated exposure and radiation exposure rate are displayed simultaneously.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

Figure 12:
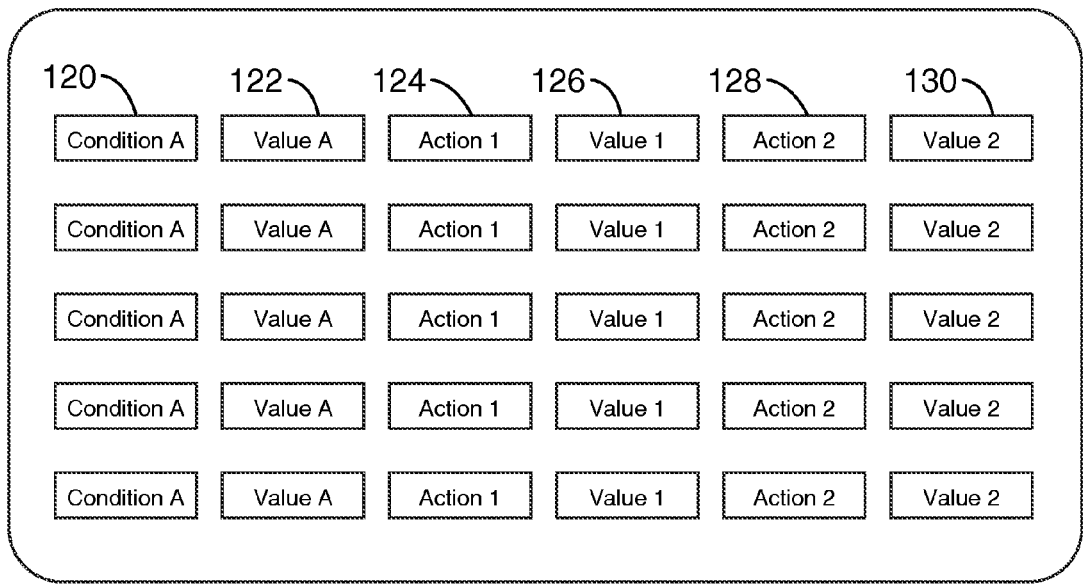
FIG. 12 illustrates an exemplary context sensitive PC pull down menu in accordance with the present invention.
Figure 13:
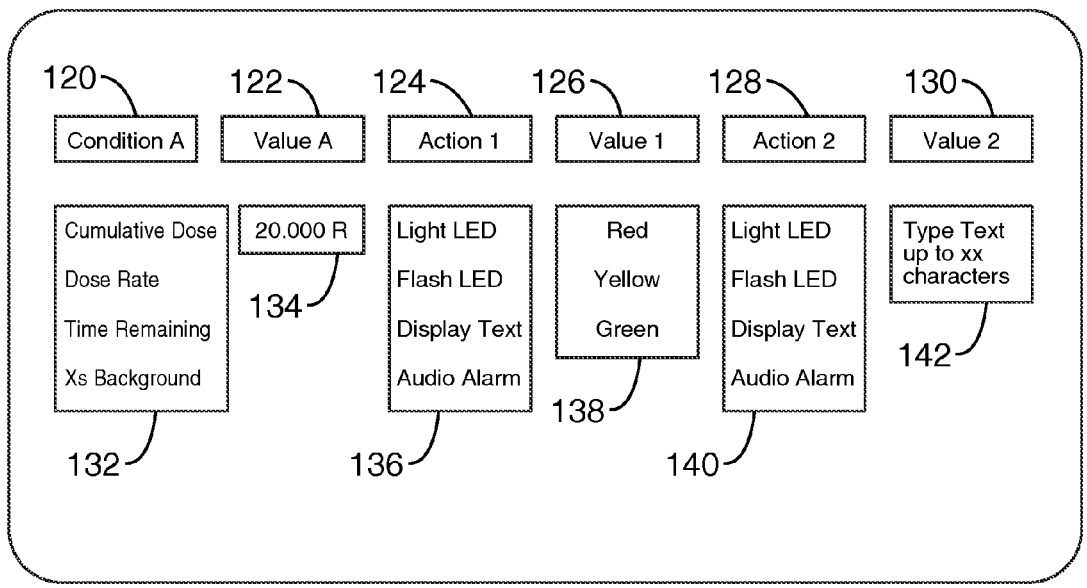

FIG. 13. illustrates exemplary pull-down options for the menu of FIG. 12.

DETAILED DESCRIPTION OF THE INVENTION

Referring more specifically to the drawings, for illustrative purposes the present invention is embodied in the apparatus generally shown in FIG. 1 through FIG. 13. It will be appreciated that the apparatus may vary as to configuration and as to details of the parts, and that the method may vary as to the specific steps and sequence, without departing from the basic concepts as disclosed herein.

The present invention pertains to a dynamic radiation monitor/dosimeter having a detector coupled to a computer/processor to determine, at any given location, the amount of time a person has before a pre-selected maximum permissible radiation exposure is received. In general terms, the monitor dynamically calculates and outputs the user's permissible stay time for a given area based on a personalized maximum permissible dose, and adjusts in real time the output based on changes in exposure rate at any given location, accumulated dose, and elapsed time. The monitor also provides the user audio and visual feedback such as varying background colors for different stay time ranges.

More particularly, the purpose of radiation monitor of the present invention is to provide emergency response personnel (Fire, Police, HAZMAT) with dynamic, continual real time updates on how long they can safely remain in a radiation area when responding to an accident or terrorist event involving radiation.

The device and methods of the present invention greatly simplify the information given to the responder and provides the critical data needed to answer critical questions, such as: "How long can I safely stay here?" Or, "If I move the patient back two feet, how much more time will I have?"

Figure 1:
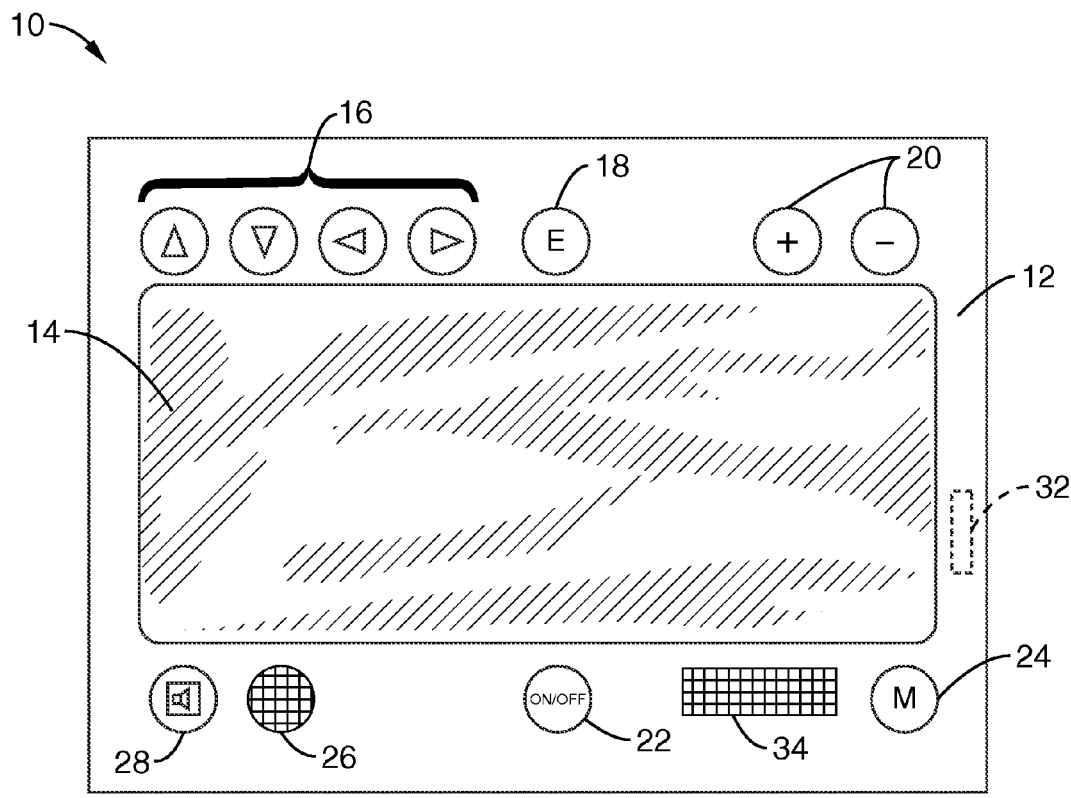
FIG. 1 is an embodiment of a portable radiation monitor in accordance with the present invention.
Figure 2:
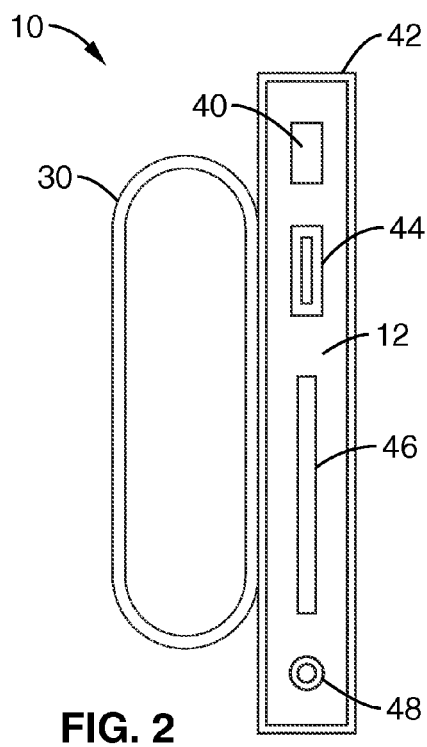
FIG. 2 is a side view of the portable radiation monitor of FIG. 1

Referring to FIGS. 1 and 2, a radiation monitor 10 in accordance with the present invention is illustrated.

Externally, the monitor 10 comprises a housing 12 having a display 14, speaker 26, and plurality of control buttons. For example, a plurality of arrow buttons 16 may be used to control the on-screen display in a "set-up" mode for assigning the desired user variables and parameters. Alternatively, a single arrow button may be provided in compass configuration. The device may also have an "enter (E)" button 18 for selecting menu functions and for entering "set up" mode (e.g. by pressing button 18 for 5 seconds to initiate the set-up menu out of a locked configuration).

The mode (M) button 24 is used for toggling between display options, such as time, dose rate, total dose etc. To save battery life, the device may have an on/off button 22 for powering up/down the unit. The mode (M) button 24 may also be context sensitive. For example, when the device is displaying an alarm, the M button may be pressed to stop or "acknowledged" the alarm. The same may occur when any alarm or message was displayed. After the message or alarm was acknowledged, the M button would revert to its display mode function.

The monitor 10 may also have audio controls such as volume (+) or (−) buttons 20 to change the output of the signal to the speakers. Volume (+) or (−) buttons 20 may also be used to change the display brightness in other modes. Where it is desired to have the device operate in silence, the monitor 10 may also include a mute or toggle 28 for the tone alarm.

Referring to FIG. 2, housing 12 may also support components accessible from the side of the radiation monitor 10, e.g. input port 40. The monitor 10 generally comprises a standalone device having a radiation detector 58 (FIG. 3) directly integrated into the device to provide audio and visual information to the responder. Alternatively, the monitor 10 may comprise a mini-computer that is configured to work with a standard external detector (not shown) that is coupled to the monitor 10 via input port 40. The device may optionally have a PC interface, such as USB, serial, or other communication port 44 for programming one or multiple devices and/or downloading or uploading stored data. A wireless receiver/transceiver may also be included in addition to, or as an alternative to, communication port 44. Additional features may include a port and memory module 46, for interchangeably inserting memory, such as a flash card (CF, SD, MS, etc.), or an audio out 48 such as a headset jack or wireless RF transceiver for receiving the audio signal through headphones or the like.

To protect the monitor 10 from water or other elements in hostile environments (e.g. firefighters, military, etc.), a transparent waterproof casing 42 may be provided with soft button access to the mode button 24 or other buttons may be provided. The casing 42 may also be temperature and impact resistant enclosure with a clear, magnifying (i.e., transparent) top, such that the display 14 will be magnified by the top surface of the case 42. Case 42 may also contain an anti-glare & refection characteristics.

The housing 12 may also have attachment means, such as a belt clip, or an adjustable Velcro strap 30 for attachment to a user's wrist or forearm.

Preferably, the housing 12 may have a plastic ring slide, or similar access means, to allow batteries 32 to be readily replaced or recharged. Typical batteries may have a lifetime of 24 hours of continuous use, and may be coupled to the display 14 or other indicator for signaling the status of the battery. The batteries may comprise a thin watch-type battery, or a single AAA batter at one end. With a AAA battery, the housing 12 may still maintain a slim profile, or have a larger cross section at the end where the cylindrical battery compartment (that would protrude a little beyond the plane of the device surface) would contain a AAA battery.

Figure 3:
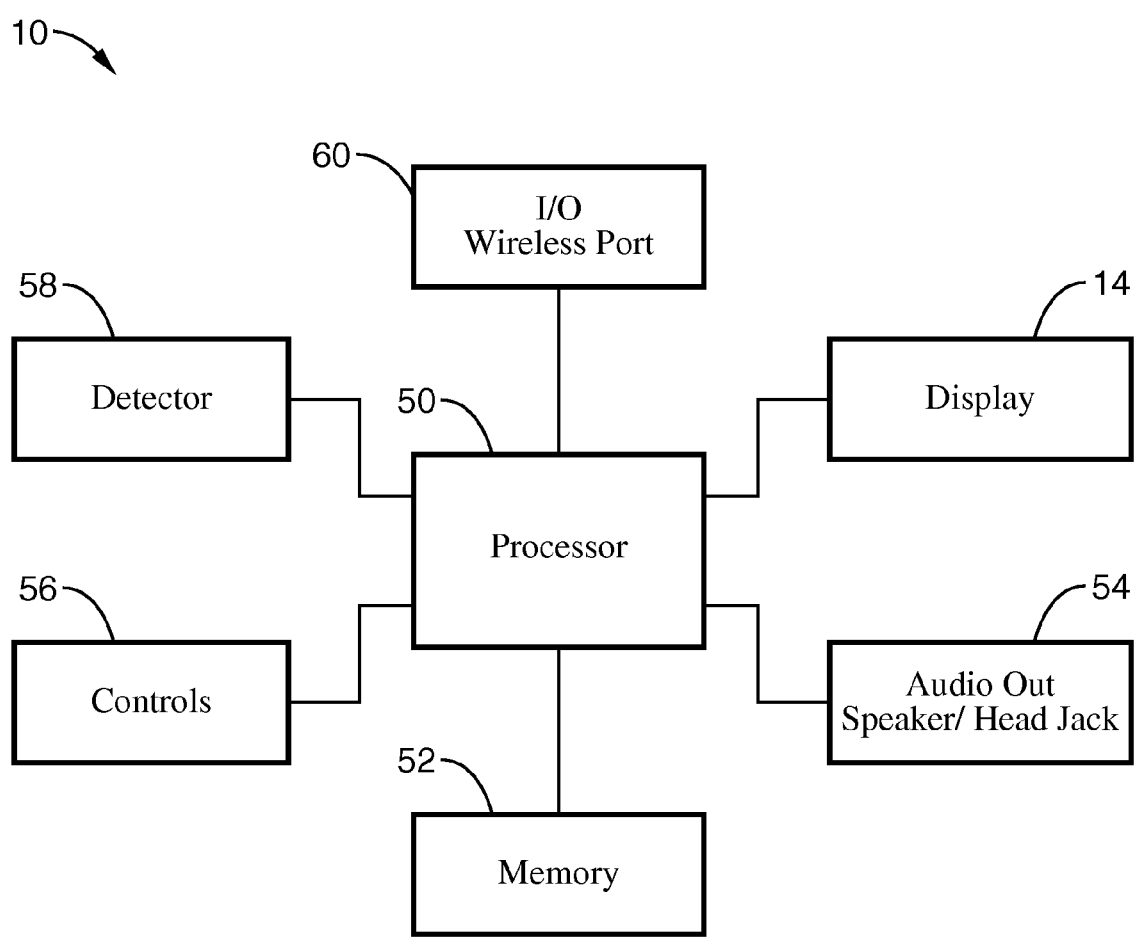
FIG. 3 is a schematic view of the components of a portable radiation monitor such as that shown in FIG. 1.

FIG. 3 illustrates an exemplary component diagram of radiation monitor 10. The monitor generally comprises a processor that is configured to send real-time radiation data input from detector module 58 to output a visual signal at display 14 or audio output 54 via the speaker 26 or head jack 48. The processor is also configured to input commands from controls 56 used for manipulating data received from detector 58 to the format/parameters desired by the user. The monitor 10 may have a communications I/O 60, such as a wireless receiver, or hard-wired port 44 for downloading or uploading data/control parameters. Inputted or downloaded parameters, device instructions, detector readings, etc. may also be stored or accessed from the processor 50 via memory module 52. Memory module 52 may comprise ROM, SRAM or DRAM, and/or other memory, such as EEPROM, flash 46, etc.

The detector 58 may comprise any radiation measuring device currently known in the art, such as a radiation sensitive pin diode or small giger-muller (GM) detector. A passive dosimeter strip 34 with integrated metal filters, may be incorporated to provide a permanent record of the radiation exposure (e.g. an OSL optically stimulated luminescence strip such as the Luxel Dosimeter manufactured by Landauer, Inc. of Greenwood Ill.). The strip may be integrated with housing 12, and be replaced or changed out for each different operator, or event. Films or TLD's (thermal luminescent dosimeters) may alternatively be used.

During use, the processor 50 continuously analyses the radiation intensity, as read from the detector 58, and informs the user/responder of how long he or she can remain in a radiation area before receiving a pre-set maximum dose of radiation. As time passes and/or the responder moves closer to the source of radiation and the intensity increases, the processor 50 will re-compute a stay time for that location based on the pre-set maximum dose and the higher dose rate. Correspondingly, the emergency responder moves further away from the source of radiation, the processor 50 will re-compute the stay time based on the lower dose rate.

The monitor 10 may be programmed to take readings at intervals ranging from more than once per second, to once every five or more seconds, etc. The frequency at which the detector takes a reading, and/or the frequency that the display updates or refreshes, may be changed according to the user's expected needs, e.g. battery-life savings for long-but-low radiation exposure environments, or rapid data exchange for environments that are anticipated to have a high exposure rates. The update frequency may also be dynamic, e.g. automatically increasing the update frequency upon breaching a preset threshold dose rate or a percentage of the pre-set maximum dose.

For example, the device may take readings from the detector 58 every second. But because of changes in background, radiation rate, etc. the display may rapidly fluctuate between values. In some situations, the result may be an erratic display that is distracting to the user. Thus, the radiation monitor 10 may be programmed to update the display according to a display time interval (DTI), i.e. the display output remains locked even though the accumulated dose or stay time have changed. Preferably, the DTI is programmed to change according to the percentage of the maximum specified dose. For example, for an accumulated dose between 0-10% of the maximum specified dose, the DTI may be specified at 5 minutes, 2 minutes between 11-50% of the maximum specified dose, 1 minute between 51-90% of the maximum specified dose, 30 seconds for over 90% of the maximum specified dose, and once per second for 95% of the maximum specified dose. Of course, these percentages and rates could be varied according to the user's desired sensitivity.

In addition, the processor may be configured to average the measured dose rates over a period of time to smooth out the display readings for stay time and dose rate. The averaging interval may also be a function of the percentage of maximum specified dose. For example, the processor may be configured to take the average of 5 readings over 5 seconds, 10 readings over 10 seconds, or 30 readings over 30 seconds, depending on the percentage of the maximum specified dose accumulated. Because the accumulated dose reading does not vacillate, display of the accumulated dose may always be displayed real-time. The averaging interval may be implemented in addition to, or in place of DTI parameters. Both serve to improve the readability of the display by avoiding rapid fluctuations of the stay time in low exposure and exposure rate environments.

In a referred embodiment, the computer/processor 50 may be programmed to analyze the radiation exposure rate and compute accumulated dose, stay time and store personnel data. Before an individual enters a radiation area, he/she is assigned a maximum permissible dose of radiation for the emergency response. This maximum dose is stored in the computer for that individual. When the responder enters the radiation area, the device begins to provide audio and visual feedback. The monitor 10 is configured to be individually programmed for multiple responders, so that data for a each responder (e.g. lifetime accumulated exposure) may be saved, transferred, or refreshed after each use.

The self-reading monitor/dosimeter of the present invention is configured to be programmed by a knowledgeable user (e.g. a device administrator or DA) that has the responsibility to "program" the device response through the use of a simple intuitive computer interface. The interface allows the DA to enter the time remaining, a dose rate, cumulative dose, or a multiple of backgrounds and then select from a series of pull down windows for the response that is desired to occur in the event the entered condition was sensed by the monitor. The desired units (e.g. mrem or uSv) that are output may also be user selected.

The desired response may include any one or more of the device display features including: changing the display 14 background color (solid or flashing), displaying text (solid, flashing or scrolling) messages (e.g. entered by the DA), setting audio alarm parameters, and setting the main display 14 to cumulative dose, dose rate or time remaining etc). This process may be repeated for as many conditions as the DA wanted.

FIGS. 4-9 illustrate detailed views of the display 14 readout and functions. The radiation monitor 10 is configured to graphically output digital numeric information derived from the processor 50 and detector 58. The display preferably comprises one or more meters, such as upper meter 76 and lower meter 80. The meters are configured to display the status of a particular reading or value set by the operator.

Figure 4:
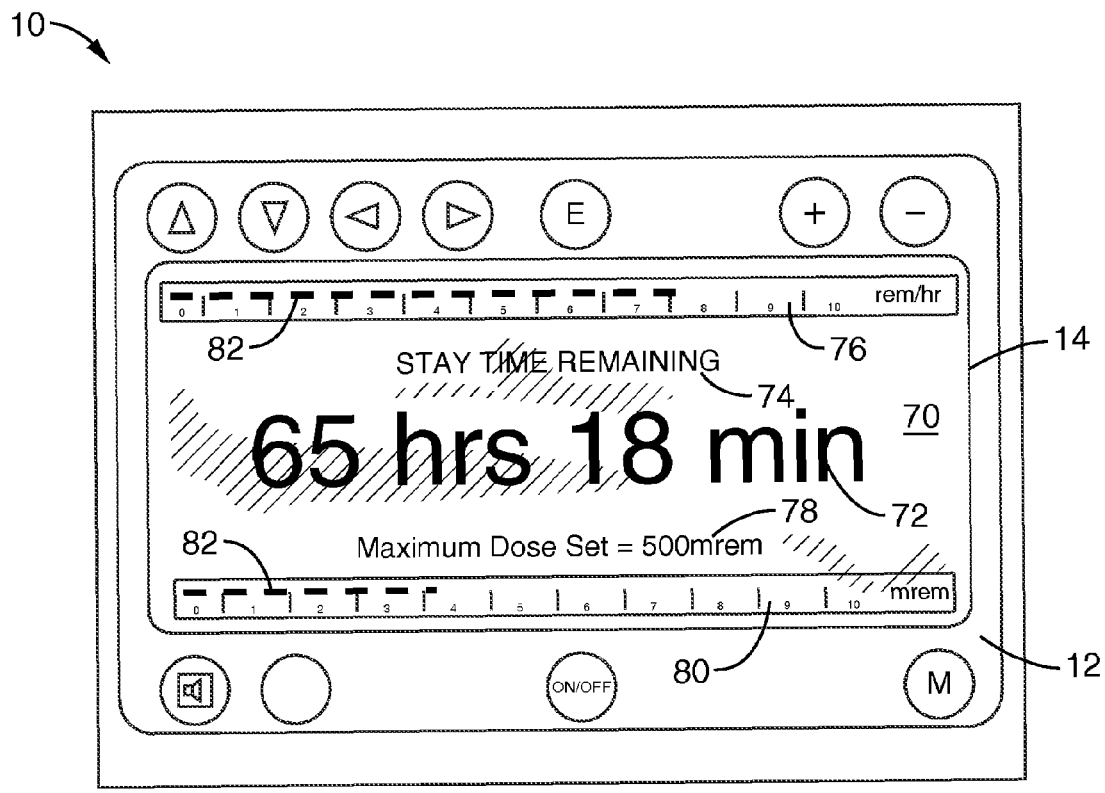
FIG. 4 illustrates an exemplary display readout of the radiation monitor of the present invention, with a primary readout showing stay time remaining.

For example, the embodiment shown in FIG. 4 shows the bottom meter 80 displaying the total radiation dose (mrem) that the operator is exposed to, and the upper meter 76 shows the current dose rate (mrem/hr) recorded by the detector. Each meter generally comprises a status bar 82 showing the current dose rate or accumulative dose read by the detector. In FIG. 4, the status bars 82 indicate a dose rate of 7.6 mrem/hr and a total accumulated dose of 3.7 mrem.

The display 14 is also configured to output a primary readout 72 selected by the operator. The primary readout 72 may be any of the parameters set by the user or DA. In the embodiment of FIG. 4, the primary readout 72 is selected as the stay time remaining, as indicated by the primary readout identifier 74. In this case, the processor 50 continuously updates the remaining stay time based on the entered maximum dose (illustrated by the maximum dose identifier 78), dose rate of and a total accumulated dose. For the given timeframe, the stay time remaining is computed as:

(500 mrem−3.7 mrem)/7.6 mrem/hr=65.3 hrs, or 65 hrs, 18 min.

Each subsequent update, the remaining stay time, dose rate of and total accumulated dose are updated to reflect new detector readings.

The primary readout 72 (e.g. stay time) is preferably output against a colored background 70 that varies color based on the status of the primary readout. The background color may be achieved through a color-capable display (e.g. a color LCD), or may have a colored backlighting, such as a series of LED's. For example, a green background may indicate stay times greater than 30 minutes, a yellow background may indicate stay times between 30 minutes and 10 minutes, and a red background may indicate stay times between 10 minutes and 5 minutes. Additionally, as the stay time reaches less than 5 minutes, the red background may flash. The flashing frequency may also increase as the stay time lowers, e.g. less than one minute.

FIGS. 4 through 7 illustrate different possible display 14 outputs based on varying conditions. Under the stay time intervals specified above, the display in FIG. 4 would have a green background (65 hour permissible stay time), indicating a condition of no alarm.

Figure 5:
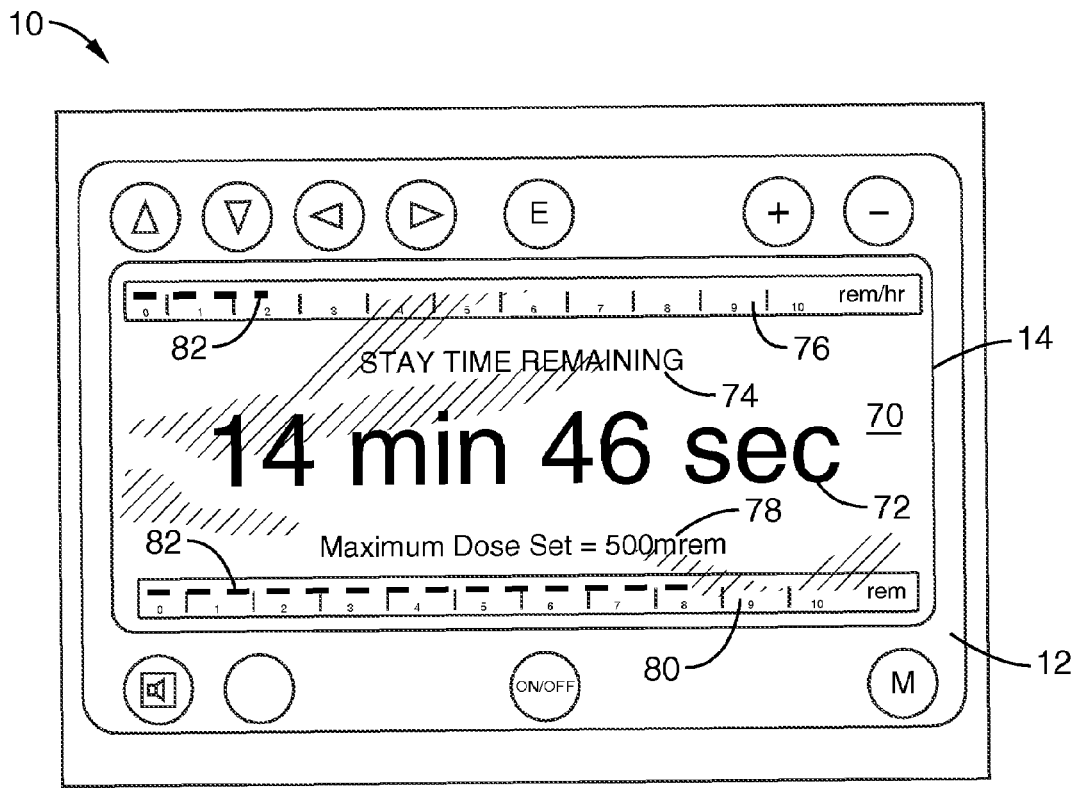
FIG. 5 illustrates another exemplary display readout of the radiation monitor of the present invention.

As illustrated in FIG. 5, the dose rate reading is shown to have dramatically increased (2 rem/hr). Although the accumulated dose is still relatively low (8 mrem), the rate is increased such that the stay time (14 min, 46 sec) has changed [(500 mrem−8 mrem)/2 rem/hr=0.246 hrs or 65 hrs, 14 min, 46 sec] to the second level interval, and thus the background color 70 is changed to yellow to indicate a moderate level of alarm.

Figure 6:
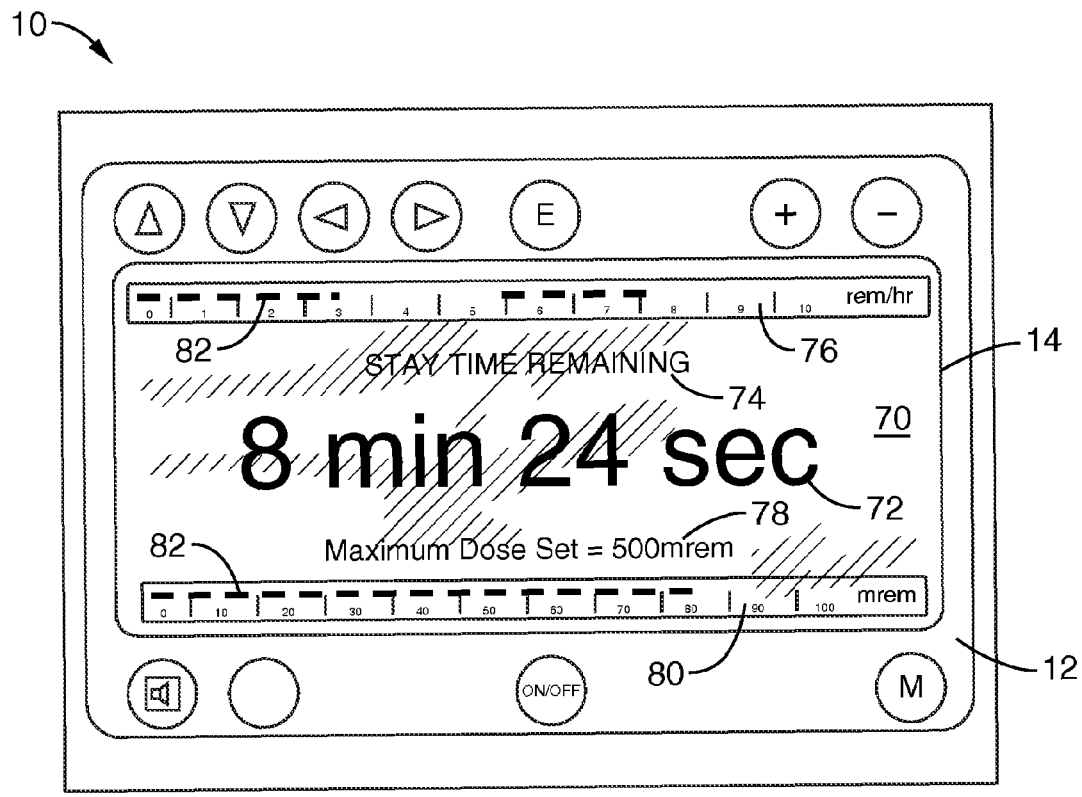
FIG. 6 shows yet another display readout of the radiation monitor of the present invention.

Now referring to FIG. 6, after a period of time at high dose rate, the accumulated dose 80 mrem at the 3 rem/hr dose rate corresponds to an 8 min, 24 sec. stay time, corresponding to a red background 70, or heightened level of alarm.

Figure 7:
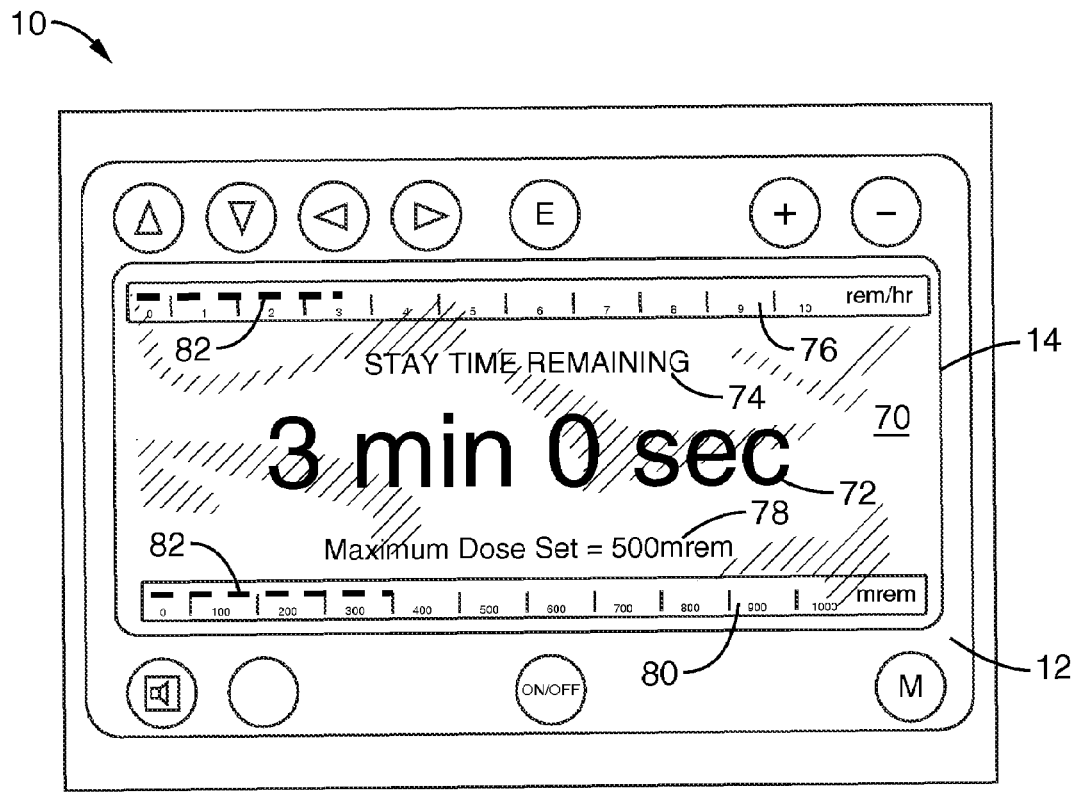
FIG. 7 illustrates another exemplary display readout of the radiation monitor of the present invention.

Referring now to FIG. 7, the accumulated dose of 350 mrem at the 3 rem/hr dose rate corresponds to only a 3 min permissible stay time given the 500 mrem maximum dose, and thus the red background 70 would be flashing or blinking to indicate extreme alarm.

It will be appreciated that the foregoing time categories and periods are non-limiting, and that the radiation monitor 10 may be programmed to have other time categories and periods. In other words, the times for switching from green to yellow, from yellow to red, and from red to flashing red are completely programmable based on, for example, the total dose that could be sustained by the responder taking into account such things as departmental policy on maximum allowed dose and prior exposure to radiation. In addition, other colors e.g. blue, orange, etc, may be used in addition to or as an alternative to the above described color set.

Figure 8:
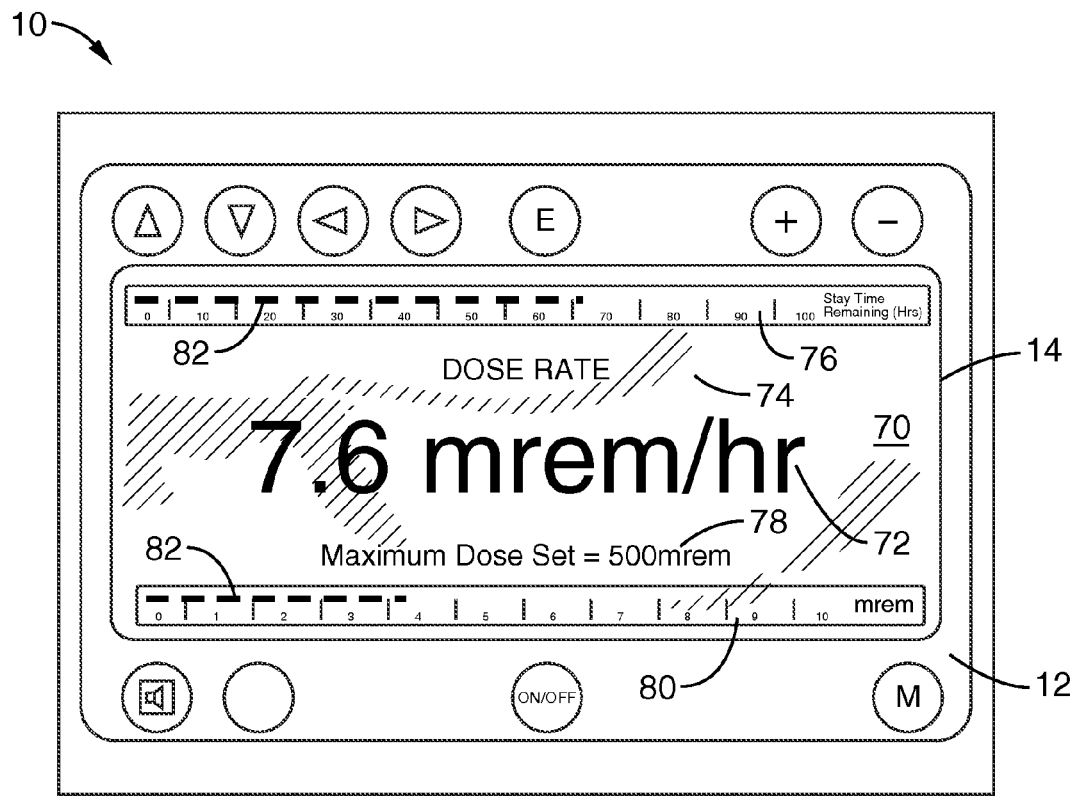
FIG. 8 illustrates an exemplary display readout of the radiation monitor of the present invention, with a primary readout showing the dose rate.
Figure 9:
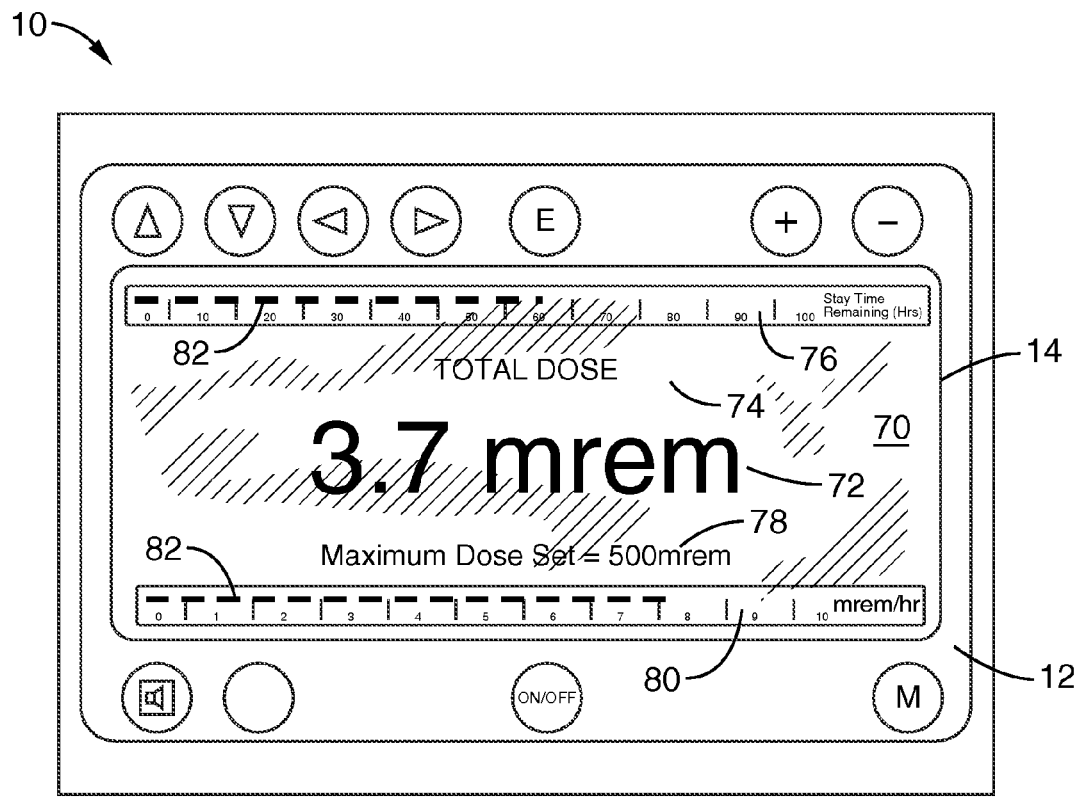
FIG. 9 illustrates an exemplary display readout of the radiation monitor of the present invention, with a primary readout showing the total accumulated dose.

The display 14 may be set to update the stay time at varying intervals and varying modes of display, such as, dose rate, cumulative dose, stay time, etc. Display options include varying background colors and threshold values for color changes with stay time. In other words, the device can be switched from a "stay time mode" to a mode that illustrates the primary readout 72 to conventional units of dose rate (as shown in FIG. 8) and cumulative dose (as shown in FIG. 9. Of course, it will be appreciated that the radiation monitor 10 can be configured to change background color based intervals of dose rate, cumulative dose, or any other parameter set by the user.

Figure 10:
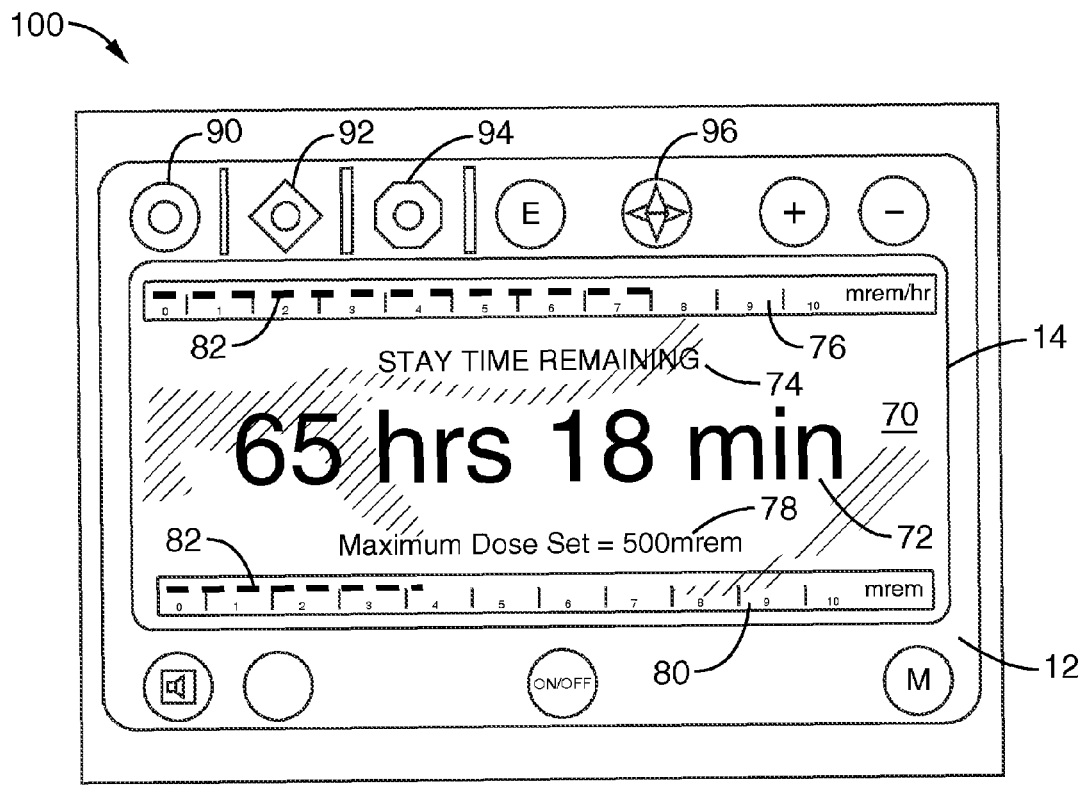
FIG. 10 illustrates an alternative configuration of the radiation monitor of the present invention, with an additional LED status indicators.

Referring now to FIG. 10, radiation monitor 100 may alternatively be equipped with a display 14 having a monochrome background 70. In this configuration, the background 70 color would remain the same, and a series of indicators 90, 92, and 94 may be used to display status or warnings according to the above mentioned stay time ranges. Each of the indicators may have a colored LED, or other illumination source, that illuminates according to the current calculated stay time. For example, for a stay time over 30 minutes, the first LED 90, having a green color, would illuminate, while the second LED 92 and third LED 94 remain unlit. For a stay time between 30 min and 10 min, the second LED 92, having a yellow color, would illuminate. For a stay time between 10 min and 5 min, the third LED 94, having a red color would illuminate. The third LED 94 could also flash for a stay time lower than one minute. Generally, only one LED would normally be illuminated at one time, except during a "notice alarm" when it is desired to draw the wearer's attention to new text is being displayed. In this case both the green and yellow LED may flash simultaneously.

Each of the LED indicators 90, 92, 94 may also have a different shape, boarder and distinctive positions on the monitor. Thus, the position and corresponding shape and boarder of the illuminated alarm help the wearer to distinguish which of the alarms is activated. For example a color-blind person could use these other features (position, shape and boarder) to figure out which alarm had been activated.

FIG. 10 also illustrates use of a monitor 100 having a cursor type button 96 for moving left-right, up-down along menu options.

Furthermore, the device is optionally equipped with an audio speaker 26 as well as an audio out 48 such as a headset jack, or RF audio output transmitter for wireless responder headsets and incident control center telemetry. The audio out 48 allows the responder to receive vital information in low light or smoke filled environments where it would be difficult to read the meter display. The radiation monitor is configured to change the tone, sound, or frequency of the audio signal based on the status of a particular parameter. For example, for a calculated stay time above 30 min, the audible tone alarm may be off. When the stay time falls in the range between 30 minutes and 10 minutes, the tone may alarm at a rate of once every 10 seconds, once every three seconds for a stay time of 10 minutes to 5 minutes, and once every half second for a stay time below 5 minutes. Optionally, information can be sent to a wireless telemetry receiver for central monitoring of the radiation exposure information.

The radiation monitor 10 may also be programmed to display a particular pre-programmed message 116 (see FIG. 11) upon determination of a particular event or threshold exposure level. For example at 100 mrem/hr the device may be selected to flash yellow and display the scrolling message "Exposure rate exceeds 100 mrem/hr . . . . Notify command post and report your location)." Another example may be when a cumulative dose of 10 rem is reached the detector may turn red and display the message "One-half of maximum dose reached, prepare to return to control point," or "One-half of maximum dose reached . . . . Notify command post and engage only in immediate life saving activities." These messages may display at the region of the primary readout, and may alternate with the readout while the condition is still present.

The pre-programmed text messages may also be transmitted via an audio signal, e.g. through a pre-recorded voice or computer generated audio message. These audio messages may be transmitted in addition to, or as an alternative to, a visual text message.

Figure 11:
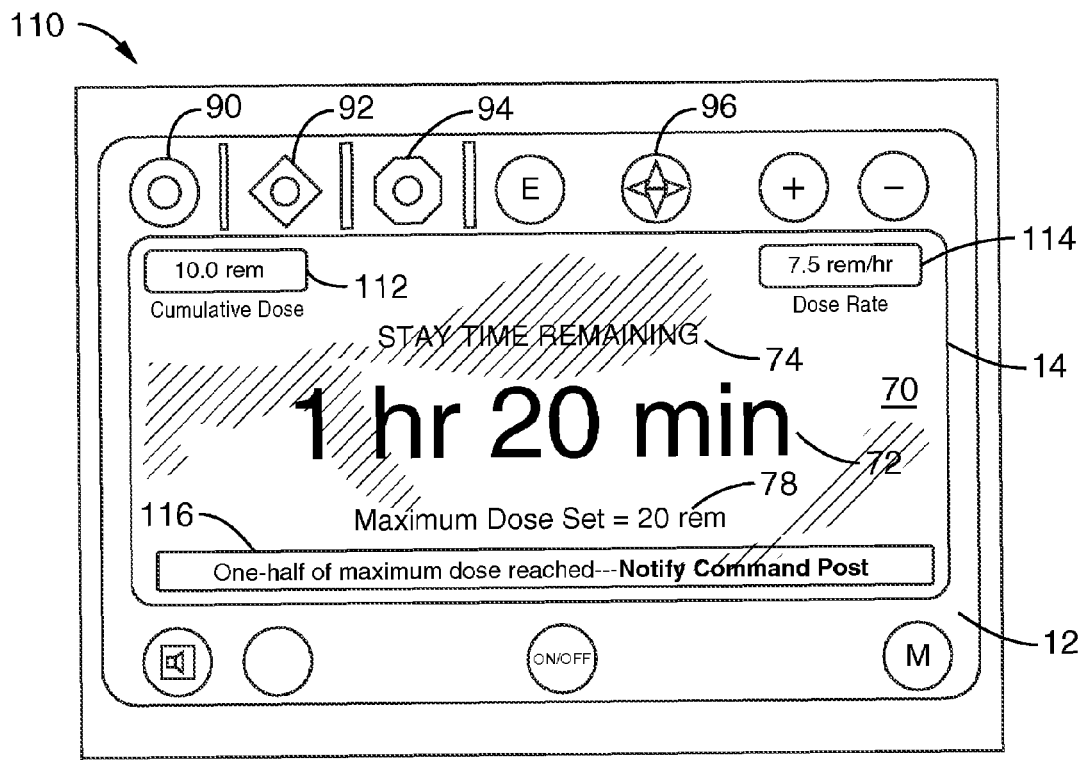
FIG. 11 shows another alternative configuration of the radiation monitor of the present invention, with numeric status meters and a programmed text message.

FIG. 11 shows an alternative display readout, which may be used on either monitor 10 or 100. In this embodiment, the status meters are replaced by numeric indicators 112 and 114, if so desired by the user. The pre-programmed text message 116 is also displayed prominently along the bottom of display 14.

The radiation monitor 10 may also have the capability to measure and calculate an "average background," i.e. ambient radiation level, with the push of any of the control buttons (e.g. holding down the "mode" button 24. For example, the "average background" would be derived from an average or median dosage rate at entry into a target area. The radiation background is then stored in memory, and continually compared against the subsequent dose rate at each update.

This feature may be used, for example, in a higher than normal radiation background area in which one is trying to locate focal hot spots, or large deltas in radiation exposure rate, in the contaminated area. For example, the radiation monitor 10 may be programmed by the DA to average the new background for a given period of time (e.g., 5 minutes). Then the device will report (alarm) by one or more of the selected methods (e.g., color, alarm, audio message, text), etc when radiation exposure levels reach administrator selected multiples of the new average background (e.g., 10, 50, and 100 times background). These levels (i.e., conditions), having been previously associated with one or more given device actions, will have a corresponding alarm indicator. For example the average background in the contaminated area may be 2 mrem/hr (e.g., approximately 40 times higher than normal background). When the device detects a field of 20 mR/hr (i.e., 10 times the newly acquired background), the detector may start to flash green at one second interval and display a scrolling message (previously input by the device administrator) "Hot spot detected at >20 mR/hr. Notify command post of your current location."

Referring now to FIGS. 12 and 13, an exemplary context sensitive PC pull down menu in accordance with the present invention is illustrated. As shown in FIG. 12, the display 12 may show a series of programmable conditions 120. Each condition box 120 each has a pull-down menu 132 (see FIG. 13) of different radiation exposure criteria to select from. Each condition will also have a value box 122 and corresponding pull-down 134. The value selected at box 122 will determine when the specified secondary signal identified in the action 1 box 124 and corresponding pull-down 136. The value 1 box 126 may further specify the action to be communicated, e.g. illuminate a red, yellow or green display. In addition, a tertiary signal can be defined (e.g. text message, audio signal, etc.) with the action 2 box 128 and corresponding pull-down 140. The tertiary signal may be further qualified with the value 2 box 130 and associated pull-down 142. If necessary, additional signals may also be assigned to occur on a given condition.

In one embodiment, the radiation monitor could house an imbedded GPS receiver that would allow the coordinates to be logged in the device and saved or transmitted to a command post. This data could then be used to map a particular area, or even provide a contoured map of exposure rates similar to that illustrated in topographical geographic maps. This could also be accomplished indoors with existing technology such as an imposed laser grid system.

The device may further include a training mode using RFID technology that allows the user to simulate the presence of radiation (without actual exposure to radiation) using an RF signal. Generally, radiation monitor 10 or 100 may be coupled with a RF receiver (not shown) that is either integrated into the device, or coupled to the processor 50 via input port 40 or communications port 44. An RFID tag would be placed in a training area to simulate a radiation source. The inverse square law behavior of the RF signal will simulate ionizing radiation exposure. As the location of the monitor 10/100 nears the location of the RFID tag, the received RF signal will intensify in much the same way as a radiation source. Correspondingly, the unit display will respond in the same way as in the normal operating mode except that the words "training mode" will be prominently displayed Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A personal radiation monitor, comprising:
a processor responsive to a radiation detector;
said radiation detector configured to produce real time radiation exposure data;
said processor configured for calculating one or more characteristics of an individual's radiation exposure;
said processor further configured to continuously recalculate said radiation exposure data to update the one or more radiation exposure characteristics; and
a display responsive to information provided by said processor, said display adapted to display at least one of said one or more radiation exposure characteristics as a primary signal from said processor;
said processor further configured to transmit a secondary signal to said individual;
said secondary signal correlating to a range of values of one of said one or more radiation exposure characteristics;
wherein at least a portion of said display is configured to change color upon one of said one or more radiation exposure characteristics exceeding a threshold limit outside said range of values;
wherein said display is configured to illuminate a first color upon a radiation exposure characteristic falling within a first range of values, and a second color upon a radiation exposure characteristic falling within a second range of values;
wherein said one or more radiation exposure characteristics further comprise a stay time based on the individual's maximum permissible radiation dose limit;
wherein said processor is further configured for periodically recalculating said stay time;

wherein update frequency of the recalculation is a function of one or more of the radiation exposure characteristics;
wherein said processor is configured to output said stay time to the display at a display time interval; and
wherein said display time interval locks the value of the display for a specified period of time.

2. A radiation monitor as recited in claim 1, wherein said display is configured to illuminate a third color upon a radiation exposure characteristic falling within a third range of values.

3. A radiation monitor as recited in claim 2, wherein the display is configured to flash the third color upon a radiation exposure characteristic falling within a fourth range of values.

4. A radiation monitor as recited in claim 1, further comprising:
one or more illumination sources in proximity to said display;
wherein said one or more illumination sources are responsive to said secondary signal so as to communicate one or more radiation exposure characteristics exceeding a threshold limit outside said range of values.

5. A radiation monitor as recited in claim 1:
wherein said processor is further configured to transmit a tertiary signal to said individual;
wherein said tertiary signal comprises an audio signal having a rate associated with said range of values; and
wherein said audio signal rate is configured to change upon one of said one or more radiation exposure characteristics exceeding a threshold limit outside said range of values.

6. A radiation monitor as recited in claim 1, wherein said one or more radiation exposure characteristics comprise an accumulative radiation exposure level.

7. A radiation monitor as recited in claim 1, wherein said one or more radiation exposure characteristics further comprise a radiation dose rate.

8. A radiation monitor as recited in claim 1, wherein said processor is configured to average the radiation dose rate over a period of time to stabilize the display of the stay time in fluctuating radiation exposure environments.

9. A radiation monitor as recited in claim 1, wherein at least a portion of the display changes color when the stay time exceeds a threshold limit outside said range of values.

10. A radiation monitor as recited in claim 1, wherein the display is configured to simultaneously display two or more of radiation exposure characteristics comprising: radiation dose rate, accumulative dose, or stay time simultaneously.

11. A radiation monitor as recited in claim 10, wherein the accumulative dose is displayed as a percentage of the individual's maximum permissible radiation dose limit.

12. A radiation monitor as recited in claim 10, further comprising:
a plurality of controls coupled to the processor;
wherein the controls are configured to allow the primary readout to be toggled between the one or more radiation exposure characteristics.

13. A radiation monitor as recited in claim 1, wherein the display is configured to display one of the one or more radiation exposure characteristics as a primary readout.

14. A radiation monitor as recited in claim 13, wherein one or more of the remaining radiation exposure characteristics are simultaneously displayed on a status meter.

15. A radiation monitor as recited in claim 1, wherein the display is further configured to transmit a pre-programmed message upon a specified radiation exposure characteristic value.

16. A personal radiation monitor, comprising:
a processor responsive to a radiation detector;
said radiation detector configured to produce real time radiation exposure data;
said processor configured for calculating one or more characteristics of an individual's radiation exposure;
said processor further configured to continuously recalculate said radiation exposure data to update the one or more radiation exposure characteristics; and
a display responsive to information provided by said processor, said display adapted to display at least one of said one or more radiation exposure characteristics as a primary signal from said processor; and
a plurality of indicators in proximity to the display;
each of said plurality of indicators having a unique shape with respect to each other;
said processor further configured to transmit a secondary signal to said individual;
said secondary signal correlating to a range of values of one of said one or more radiation exposure characteristics;
wherein one of the plurality of indicators is configured to illuminate said secondary signal upon one of said one or more radiation exposure characteristics exceeding a threshold limit outside said range of values; and
wherein a first indicator of the plurality of indicators is configured to illuminate upon a radiation exposure characteristic falling within a first range of values, and a second indicator of the plurality of indicators is configured to illuminate upon a radiation exposure characteristic falling within a second range of values.

17. A radiation monitor as recited in claim 16, further comprising:
a third indicator configured to illuminate configured to illuminate upon a radiation exposure characteristic falling within a third range of values.

18. A radiation monitor as recited in claim 17:
wherein the first indicator is spaced apart from the second indicator at a first distance, and the third indicator is spaced apart from the second indicator at a second distance; and
wherein the first distance is different than the second distance to aid in distinguishing which indicator has been illuminated.

19. A radiation monitor as recited in claim 16, wherein each of the indicators illuminates a unique color.

20. A radiation monitor as recited in claim 19, wherein a portion of the display is configured to simultaneously illuminate a color similar to the illuminated indicator color.

21. A radiation monitor as recited in claim 16, wherein each of the indicators comprises an LED positioned within a distinctively shaped border.

22. A radiation monitor as recited in claim 16, wherein said one or more radiation exposure characteristics comprise an accumulative radiation exposure level.

23. A radiation monitor as recited in claim 22, wherein said one or more radiation exposure characteristics further comprise a radiation dose rate.

24. A radiation monitor as recited in claim 23, wherein said one or more radiation exposure characteristics further comprise a stay time based on the individual's maximum permissible radiation dose limit, said processor further configured for continuously recalculating said stay time.

25. A personal radiation monitor, comprising:
a processor responsive to a radiation detector;
said radiation detector configured to produce real time radiation exposure data;

said processor configured for calculating one or more characteristics of an individual's radiation exposure;

said processor further configured to continuously recalculate said radiation exposure data to update the one or more radiation exposure characteristics;

a display responsive to information provided by said processor, said display adapted to display at least one of said or more radiation exposure characteristics from said processor; and a GPS receiver coupled to the processor;

wherein coordinate readings from the GPS receiver are configured to be logged to provide a radiation exposure characteristic reading to a particular location.

26. A personal radiation monitor as recited in claim 25, wherein the GPS receiver readings are configured to provide a radiation exposure characteristic map of a particular area.

27. A personal radiation monitor as recited in claim 26, wherein the map comprises a contoured map of exposure rates.

* * * * *